(12) United States Patent
Kiyono

(10) Patent No.: US 6,266,431 B1
(45) Date of Patent: Jul. 24, 2001

(54) ADDRESS RECOGNIZING METHOD AND MAIL PROCESSING APPARATUS

(75) Inventor: Shigeki Kiyono, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/252,039

(22) Filed: Feb. 18, 1999

(30) Foreign Application Priority Data

Feb. 20, 1998 (JP) ................................................. 10-039139

(51) Int. Cl.[7] ....................................................... G06K 9/00
(52) U.S. Cl. .............................................................. 382/101
(58) Field of Search .................................... 382/100, 101, 382/102, 286, 291, 292, 312, 317, 321, 323; 209/535, 536, 546, 547, 552, 554, 606, 612, 613, 900

(56) References Cited

U.S. PATENT DOCUMENTS

| | | | |
|---|---|---|---|
| 4,809,340 | * 2/1989 | Mersereau | 382/101 |
| 4,998,626 | * 3/1991 | Ota | 382/102 |
| 5,460,273 | * 10/1995 | Stevens et al. | 209/584 |
| 5,581,628 | * 12/1996 | Nakamura et al. | 382/101 |

* cited by examiner

Primary Examiner—Andrew W. Johns
Assistant Examiner—Shervin Nakhjavan
(74) Attorney, Agent, or Firm—Pillsbury Winthrop LLP

(57) ABSTRACT

A method recognizes an address of a letter. The method including registering data including a whole image and coordinate data of an address information mentioning position corresponding to the whole image of a referring letter, obtaining a whole image of a letter, correlating the whole image with the registered whole image, and detecting an address information mentioning position from the obtained whole image based on the coordinate data when the correlating result indicates conformity. Using data from previous read, the address may be recognized more quickly by assuming that the letter currently being read is similar to the previously read letter or letters, such as in bulk processing.

28 Claims, 8 Drawing Sheets

REGISTERD DATA OF THE TOTAL IMAGE

PRESENT MAIL

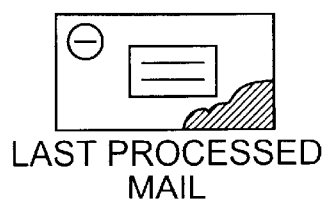
FIG. 8a
LAST PROCESSED MAIL
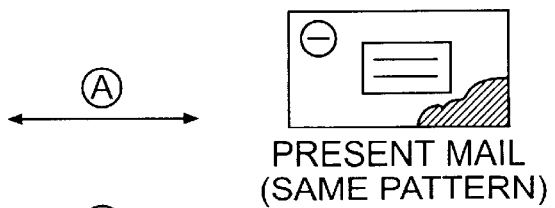
FIG. 8b
PRESENT MAIL (SAME PATTERN)
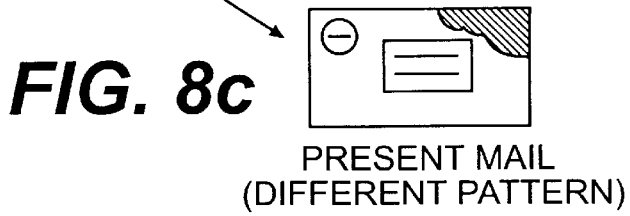
FIG. 8c
PRESENT MAIL (DIFFERENT PATTERN)
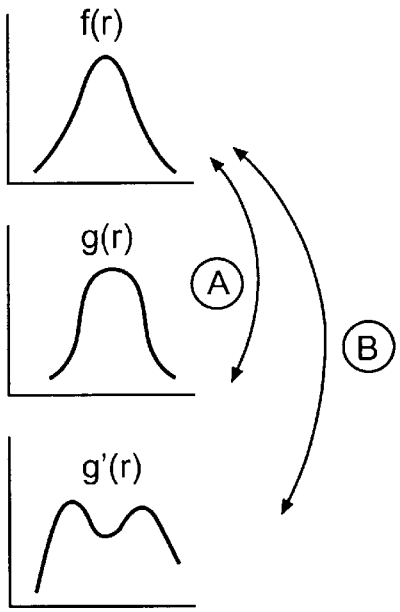
FIG. 9a
FIG. 9b
FIG. 9c
Ⓐ RELATION BETWEEN f(r) AND g(r)
FIG. 9d
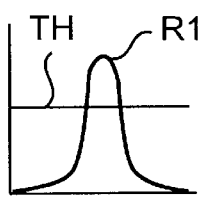
LARGE MAGNITUDE BETWEEN f(r) AND g(r)
Ⓑ RELATION BETWEEN f(r) AND g'(r)
FIG. 9e
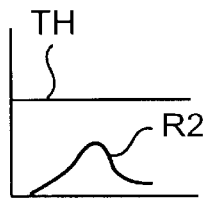
SMALL MAGNITUDE BETWEEN f(r) AND g'(r)

ADDRESS RECOGNIZING METHOD AND MAIL PROCESSING APPARATUS

BACKGROUND OF THE INVENTION

1. Field of the Invention

The present invention relates to an address recognizing method and a mail processing apparatus which reads and recognizes an address on a letter.

2. Discussion of the Background

A zip code reader-sorter takes letters one by one, reads and discriminates address information on the letter and the reader-sorter stacks the letters on the basis of the discriminated result.

However, detecting the position at which the address is displayed at the time of the discrimination is difficult, and various designs are employed for the detection. For example, for detecting the address information accurately in a large quantity of letters of the same format, as in direct mail, a cursor mode and a special forms mode are provided. In the case of direct mail according to these modes, the coordinates of the position of the address information are specified manually. The specified position is extracted from the letter as the address information position, which is read according to this specification, and the information within the extracted position is discriminated.

The application of this mode is very effective when direct mail is supplied in a large quantity. However, when direct mail is small quantities is mixed in the mail, the specification according to this mode cannot be performed. If that mode is specified, as the information written in the specified position is discriminated as the address, then when direct mail of a different format comes after a small quantity of direct mail is recognized, the information in the same region is recognized as the specified information. This causes misreading. This delays the processing.

SUMMARY OF THE INVENTION

The present invention overcomes the problems and disadvantage of the prior art by correlating position data of a letter with position data of a previous letter or position data of a letter registered in a dictionary.

An object of the invention is to provide an address recognizing method and a mail processing apparatus which reduces the load of the operator.

To achieve the object and in accordance with the purpose of the present invention, a method recognizes the address of a letter, and comprises registering data including a whole image and coordinate data of address information mentioning position corresponding to the whole image of a referring letter, obtaining a whole image of a letter, correlating the whole image with the registered whole image, and detecting address information mentioning position from the obtained whole image based on the coordinate data when the correlating result indicates conformity.

Further, the present invention provides a method for recognizing an address of a letter, and the method comprises storing whole image and coordinate data of address information mentioning position corresponding to the whole image of processed mail, comparing the last stored whole image with the stored whole image just before and judging whether it conforms, assuming processed mail is bulk mail when the conformity accumulates to a number by comparing result, obtaining a whole image of a letter, correlating the whole image with the last stored whole image, and detecting address information mentioning position from the obtained whole image based on the coordinate data when the assuming result indicates bulk mail and the correlating result indicates conformity.

Further, the present invention provides a method for recognizing an address of a letter, and the method comprises storing a whole image and coordinate data of address information mentioning position corresponding to the whole image of a processed letter, obtaining a whole image of a letter, correlating the whole image with the last stored whole image, and detecting address information mentioning position from the obtained whole image based on the coordinate data when the correlating result indicates conformity.

Further, the present invention provides a method for recognizing an address of a letter, and the method comprises registering data including a whole image and coordinate data of an address information mentioning position corresponding to the whole image of a referring letter, storing whole image and coordinate data of address information mentioning position corresponding to the whole image of processed mail, comparing the last stored whole image with the stored whole image just before and judging whether there is conformity or not, assuming processed mail is bulk mail when the conformity accumulates to a number by comparing result, obtaining a whole image of a letter, correlating the whole image with the registered whole image or the last stored whole image, and detecting address information mentioning position from the obtained whole image based on the coordinate data when the correlating result indicates conformity with the registered whole image or the correlating result indicates conformity with the last stored whole image and the assuming result indicates it is bulk mail.

Further, the present invention provides a mail processing apparatus for processing a letter on which an address is written, comprising means for registering data including a whole image and coordinate data of address information mentioning position corresponding to the whole image of a referring letter, means for obtaining a whole image of a letter, means for correlating the whole image obtained by obtaining means with the whole image registered by the registering means, and means for detecting address information mentioning position from the obtained whole image based on the registered coordinate data when the correlating result indicates conformity by the correlating means.

Further, the present invention provides a mail processing apparatus for processing a letter on which an address is written, comprising means for storing whole image and coordinate data of address information mentioning position corresponding to the whole image of processed mail, means for comparing the last whole image stored by the storing means with the whole image stored by the storing means just before, means for judging whether conformable or not based on the comparison result by the comparing means, means for assuming processed mail is bulk mail when the conformity accumulates to a number by the judging means, means for obtaining a whole image of a letter, means for correlating the whole image obtained by the obtaining means with the last stored whole image stored by the storing means, and means for detecting address information mentioning position from the obtained whole image based on the coordinate data stored in the storing means when the assuming result indicates it is bulk mail by assuming means and the correlating result indicates conformity by correlating means.

Further, the invention provides a mail processing apparatus for processing a letter on which an address is written, comprising means for storing a whole image and coordinate data of address information mentioning position corresponding to the whole image of a processed letter, means for obtaining a whole image of a letter, means for correlating the whole image obtained by the obtaining means with the whole image last stored by storing means, and means for detecting address information mentioning position from the obtained whole image based on the coordinate data stored by the storing means when the correlating result indicates conformity by the correlating means.

BRIEF DESCRIPTION OF THE DRAWINGS

Embodiments of this invention are described with reference to the accompanying drawings wherein:

FIG. 8 is a view showing an example of an image of prior mail and an image of present mail;

FIG. 9 is a view showing a correlation detecting process according to the third embodiment of the present invention.

DETAILED DESCRIPTION OF THE PREFERRED EMBODIMENT

Hereinafter, an embodiment of the present invention is described below with reference to the accompanying drawings.

Figure 1:
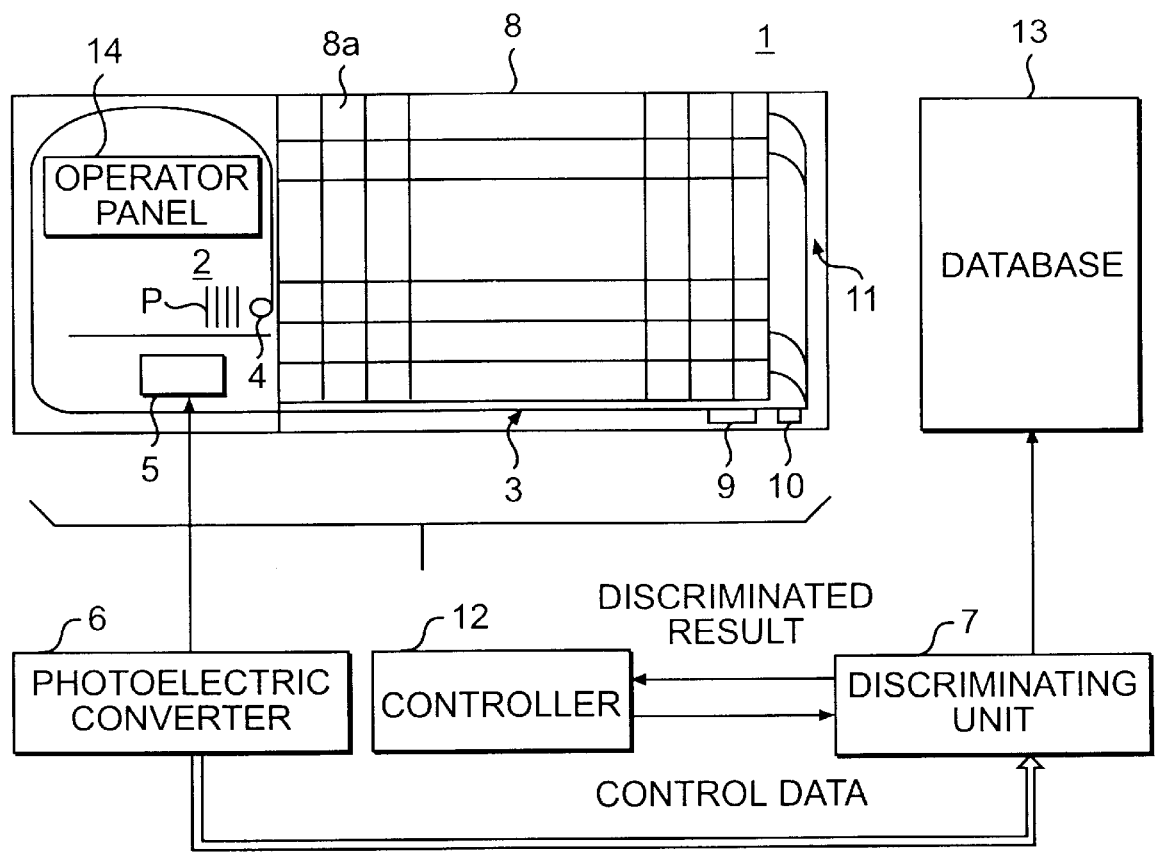
FIG. 1 is a block diagram of a mail processing apparatus of the present invention.

FIG. 1 is a block diagram of a mail processing apparatus in accordance with the present invention. A processing apparatus 1 comprises a mail supplier 2, a conveyer 3, a feeder 4, a scanner 5, a photoelectric converter 6, a discriminating unit 7, a sorter 8, a bar code printer 9, a bar code reader 10, a step pass point 11, a controller 12, a database 13, and an operation panel 14.

The mail supplier 2 receives a plurality of letters P laid randomly side by side, while the letters are aligned at the rear ends in an upright position. The mail supplier 2 feeds the letters P one by one to a specified take-out position. Although the description of the preferred embodiments describes the processing of letters, it is understood that the mail processing apparatus may handle other forms of mail, such as postcards, magazines, and packages, with corresponding changes to the elements for the mail transport in the processing apparatus 1.

At the take-out position of the letter P, the feeder 4 takes out a letter P from the take-out position one by one and feeds the same to the conveyer 3.

The scanner 5 is downstream of the feeder 4 along the conveyer 3. The scanner 5 reads optically the image of the surface of the respective letters P which are transported. The reflected light, which has scanned the surface of the letter P, is converted to a current by the photoelectric converter 6, and the obtained image data is transferred in the form of multiple-valued signals to the discriminating unit 7.

The sorter 8 is located at the end of the conveyor 3 downstream of the scanner 5, and the bar code printer 9 is located downstream of the scanner 5 but upstream of the sorter 8. The sorter 8 sorts and stacks the letter P according to the address information. Also the bar code printer 9 prints a bar code corresponding to the address information on the letter P on the basis of the discriminated result from the discriminating unit 7. The bar code printer 9 may be, for example, an ink jet printer.

The bar code reader 10 is along the conveyer 3, downstream of the bar code printer 9, but upstream of the sorter 8. The bar code reader 10 reads the printed bar code and confirms whether the bar code is printed correctly. The distance between the bar code printer 9 and the bar code reader 10 on the conveyer 3 is typically 10–15 m, in order to allow the ink of the printed bar code to dry.

The sorter 8 includes a plurality of sorting boxes 8a, which are arranged in a plurality of steps horizontally and in a plurality of rows vertically. The conveyer 3 extends to the respective sorting boxes 8a.

On the right side of the sorter 8 the step pass point 11 distributes the letters P to respective steps on the basis of the bar codes. The step pass point 11 includes a plurality of switching gates (not shown).

The controller 12 controls the mail processing apparatus 1. The discriminating unit 7 is connected to the database 13, wherein the discriminating unit 7 receives control data from the controller 12, refers to the database 13, and discriminates the address information from the image data received from the photoelectric converter 6. The database 13 includes dictionaries of the characters and various address for discriminating the address information of the letters P.

The controller 12 switches selectively the gate at the step pass point 11 and the partition gates (not shown) in the respective sorting boxes 8a on the basis of the discriminated result from the discriminating unit 7, and the letters P are sorted to the specified sorting boxes 8a.

The operator panel 14 displays a cursor mode for the operator and sets a special form mode and operation guidance.

Figure 2:
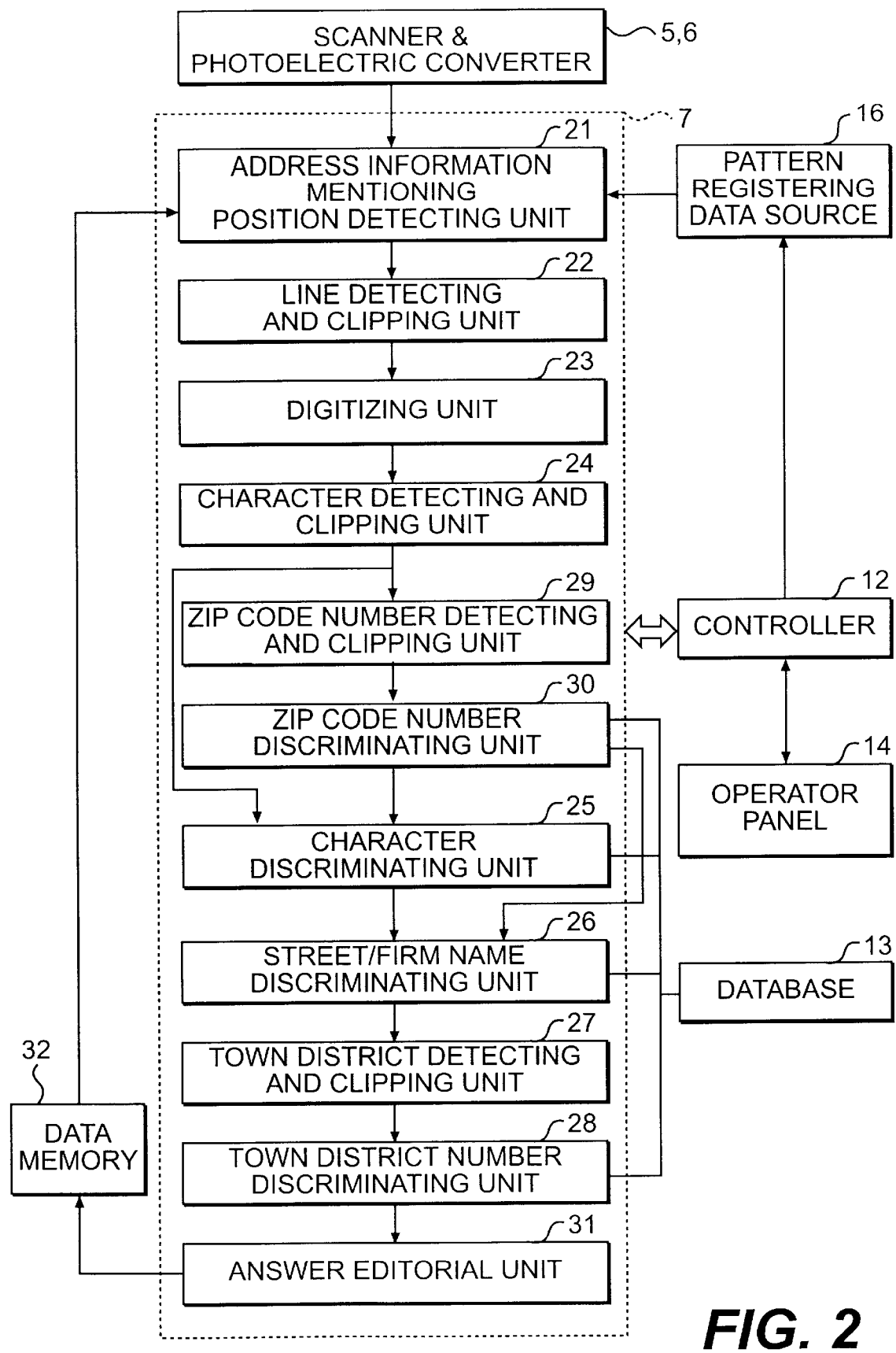
FIG. 2 is a block diagram of a discriminating unit of FIG. 1.

FIG. 2 shows a block diagram of a discriminating unit shown in FIG. 1.

Although in FIG. 1 the scanner 5 and the photoelectric converter 6 are shown as separate units, the same are shown as one block in FIG. 2 for simplicity and clarity.

The image data with multiple values, which is obtained from the scanner 5—and the photoelectric converter 6, is stored in the memory (not shown) of an address information mentioning position detecting unit 21. The address information mentioning position detecting unit 21 detects the position, in which address information is mentioned, from the image data. When the position is detected, the coordinate data and image data are transferred to a line detecting and clipping unit 22, which is connected to the unit 21.

A pattern registering data source 16 is connected to the address information mentioning position detecting unit 21. The pattern registering data source 16 registers one or more sets of image data (hereinafter called as registered data), corresponding to the letter size data, the coordinate data for the address information mentioning position, and the coordinate data for the addresser position of direct mail which is sent by addressers, as described later.

The line detecting and clipping unit 22 performs the detection and clipping of the address line involved in the address information mentioning position based on the coordinate data. The line detection and clipping at the line detecting and clipping unit 22 can be performed, for example, by a projection method. The image data of multiple-values for the line portion which are clipped at the line detecting and clipping unit 22 are sent to a digitizing unit 23.

The digitizing unit 23 converts the multiple-valued image data for the line portion into two values, and then applies the image data of the line portion which is converted into two-values to a character detecting and clipping unit 24.

The character detecting and clipping unit 24 detects and clips characters from the image data by projection method, for example, and separates characters one by one. The discriminating unit 7 may operate to recognize a character or to first recognize a zip code. If the discriminating unit 7 operates to recognize characters, the image data, which is separated one by one, is transferred to a character discriminating unit 25.

The character discriminating unit 25 discriminates the characters from the image data, which are sent from the character detecting and clipping unit 24 one by one, by referring to the dictionary of the characters registered in the database 13. The discriminated result is sent to a street/firm name discriminating unit 26.

The street/firm name discriminating unit 26 discriminates the street name or firm name according to the discriminated result of the characters by referring to the dictionary of the street/firm names registered in the database 13. The discriminated result is sent to a street name detecting and clipping unit 27. The database 13, to which the street/firm name discriminating unit 26 refers, is described later in detail. The scope of the dictionary used for correlation is limited by the discriminated result of zip code numbers, and the correlation is performed within the limitation.

The block detecting and clipping unit 27 separates the figures, such as block number which is mentioned following the street name discriminated by the street/firm name discriminating unit 26, one by one by detecting and clipping. The image data of the block number, separated one by one, is transferred to a block number discriminating unit 28.

The block number discriminating unit 28 discriminate the figures of the block number, which are sent from the block detecting and clipping unit 27, one by one by referring to a dictionary of the figures registered in the database 13.

On the other hand, if the zip code is discriminated before the discrimination of the street/firm name and block number, the discriminating unit 7 may operate quicker because the searches in the database 13 can be more limited. The discriminated result of the address is verified and supplemented. At the time of discrimination of the zip code, the characters in the position for the zip code are detected and clipped as the zip code out of the characters which are clipped by the character detecting and clipping unit 24 and separated one by one at a zip code detecting and clipping unit 29. The image data of figures here separated one by one is transferred to a zip code discriminating unit 30.

The zip code discriminating unit 30 discriminates the image data of the figures of the zip code, which are sent from the zip code detecting and clipping unit 29 one by one by referring to a dictionary of zip codes registered in the database 13.

As the zip code discriminated as described above has already indicated the street/firm name, among the address involving stories construction, such being the case, the content of the street/firm names, which are correlated with the discriminated result of the zip code, in the database 13, is limited. In this way, the incidence of correlation with the dictionaries can be reduced and the processing can be sped up. In this way, the discrimination at the zip code discriminating unit 30 and the discrimination at the street/firm name discriminating unit 26 and block number figure discriminating unit 28 are combined. Finally, the required address is verified at the answer editorial unit 31. The verified information, such as verified address information, is stored in the data memory 32, and is utilized for detecting the position at the address information mentioning position detecting unit 21, which is described in detail below.

Figure 3:
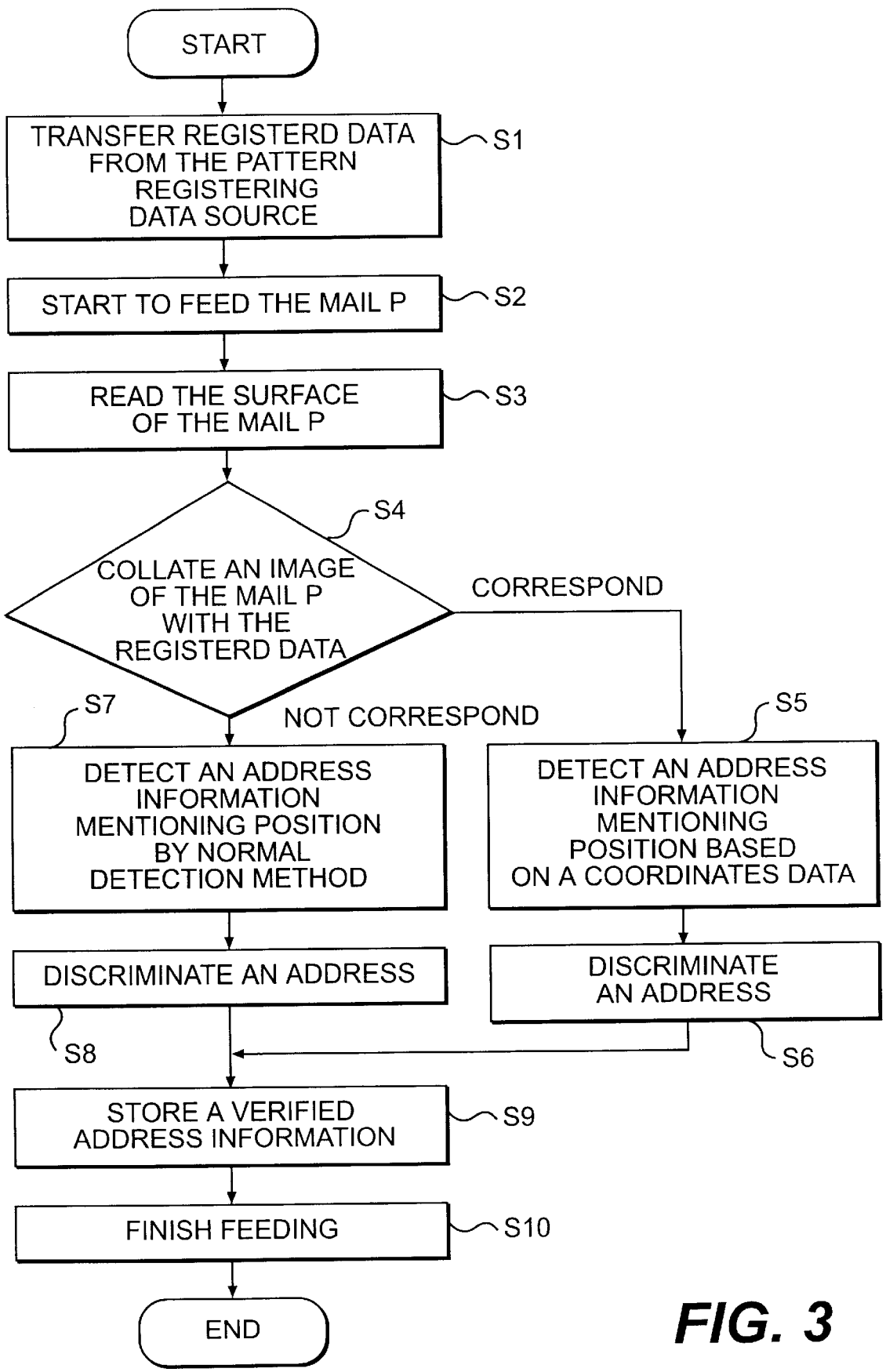
FIG. 3 is a flowchart of the operation of an apparatus detecting an address position in accordance with the first embodiment of the present invention.

Hereinafter, the first method for detecting the address position at the address information mentioning position detecting unit 21 is according to the first embodiment of the present invention, referring to FIG. 1 to FIG. 4. FIG. 3 is a flow chart showing the first embodiment of the present invention, according to which a mail processing apparatus detects an address position, and FIG. 4 is a view showing a pattern of a letter registered in the memory and a pattern of a letter which is read.

A plurality of letters P is set in the mail supplier 2 as shown in FIG. 1 and the operation is started. First, the various registered data of the letters P is read from the pattern registering data source 16 shown in FIG. 2 by the control of the controller 12 and is transferred to a memory (not shown) of the address information mentioning position detecting unit 21 (S1).

Figure 4A:
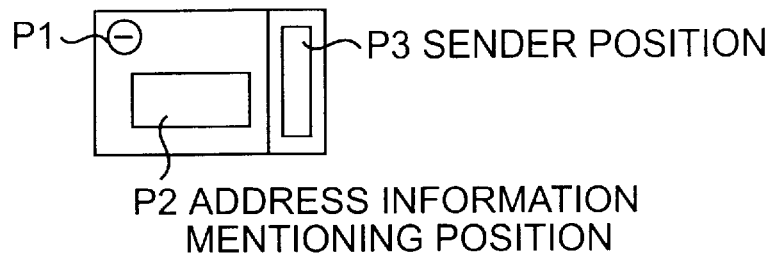
FIGS. 4a and b are views showing a registered pattern of a letter in the memory and a pattern of a letter to be read.

One of the various data transferred and stored is the registered data of the total image of the letter P as shown in FIG. 4a. In this registered data, the image is registered in the condition that data is filled in the position for stamps P1, the position for the address information mentioning position P2 and the position P3 for the addresser. In other words, arbitrary address information is mentioned in the position of the address information mentioning position P2, and also a predetermined name of an addresser is mentioned in the position for the addresser P3. Also, the various data to be stored involves the coordinate data of the address information mentioning position P2 corresponding to the registered data, the coordinate data for the addresser position P3 and the size data of the letter P.

Refer again to FIG. 3. Successively, the mail supplier 2 starts to feed the letter P (S2). The letters, which are fed at S2, are taken out one by one by the feeder 4 and transferred by the conveyer 3. The surface of the letter P is read by the scanner 5 and the image data of the letter P is read by the photoelectric converter 6 (S3).

The image data which is read at S3 is transferred to the address information mentioning position detecting unit 21 of the discriminating unit 7. First the image data of the letter P is correlated with the size data of the letter P among the various data which is stored in the memory of the address information mentioning position 21. Only the registered data having a size similar to the letter P is extracted. The registered data, which is extracted as in the above, is correlated with the image data (S4).

As to the method to detect the conformity/unconformity at S4, for example known methods such as the method of degree of the similarity of pattern or the method to obtain a correlation factor of the two patterns can be used.

Figure 4B:
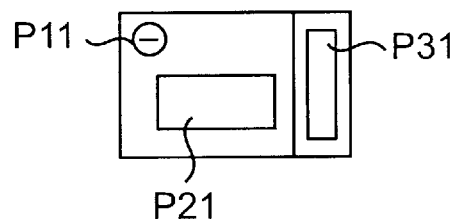

As shown in FIG. 4b, if the image data involves the position for stamps P11, the position for address information mentioning position P21, and the addresser position P31, the image is judged as conforming with the registered data by the correlation at S4. The image data, which is indicated by the coordinates of the address information mentioning position P2 which corresponds to the conforming registered data, is detected as the address information mentioning position (S5). On the basis of the address information mentioning position, which is detected in this way, the zip code is discriminated and decided by the line detecting and clipping unit 22, the digitizing unit 23, the character detecting and clipping unit 24, the zip code detecting and clipping unit 29 and the zip code discriminating unit 30. Also, the content of the dictionary of street/firm names in the database 13 can be limited on the basis of the zip codes. Successively, the street/firm name is discriminated at the street/firm name discriminating unit 26 by the line detecting and clipping unit 22, the digitizing unit 23, the character detecting and clipping unit 24 and the character discriminating unit 25. As described above, the processing is performed by using the data blank 13, which has a limited comparison range based on the zip code. Furthermore, the block number is discriminated by the block detecting and clipping unit 27 and the block number discrimination unit 28 (S6).

When the image data read out is judged not to conform with the registered data or when the data size is judged to be different in respect to the data size, a normal address information mentioning position detection is performed from the image data read from the letter P (S7). For this technique, a known method, such as the projection method, may be used, and the explanation shall be omitted in this specification.

Successively, the address information is discriminated by the same method as mentioned at S6 (S8).

The discriminating result for address information at S6 or S8 is inputted into the answer editorial unit 31, and verified as the address. The verified address information is stored in the data memory unit 32. (S9).

The address verified at S9 is transferred to the controller 12 as the discriminated result. The letter P is printed with the bar code, in which the address is coded at the bar code printer 9 according to the discriminated result obtained here, and the printed bar code is confirmed by the bar code reader 10. Furthermore, the letter P is passed through the step pass unit 11 and sorted by the sorter 8 and piled. When all the letters P, which are supplied by the mail supplier 2, are fed and processed completely (S10), the process is finished.

In the detecting method of the address information mentioning position as explained above, the registered data of the letter P, which is registered beforehand, is used.

The second embodiment of the present invention is a method by which the address information mentioning position can be detected efficiently, even if the image of the letter P is not registered beforehand. One example is processing the same kind of letters P, such as direct mail, which are supplied to the mail processing apparatus 1, in a large quantity. The processing of a large quantity of the same kind of letters P is called bulk processing.

Figure 6:
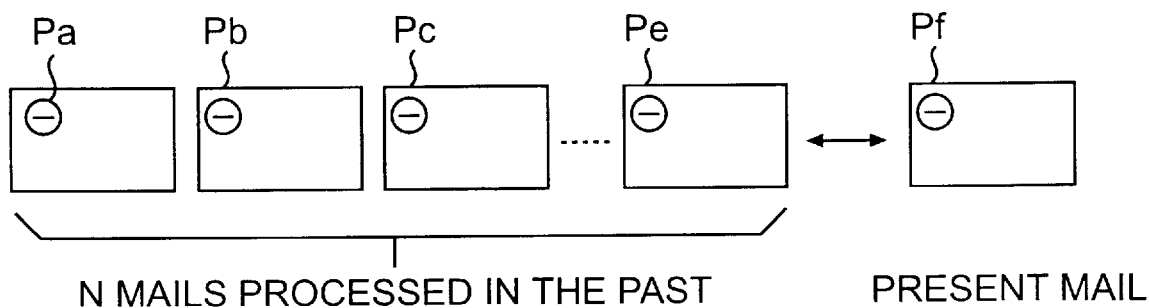
FIG. 6 is a view showing an example of images of mail according to the second embodiment of the present invention.
Figure 5:
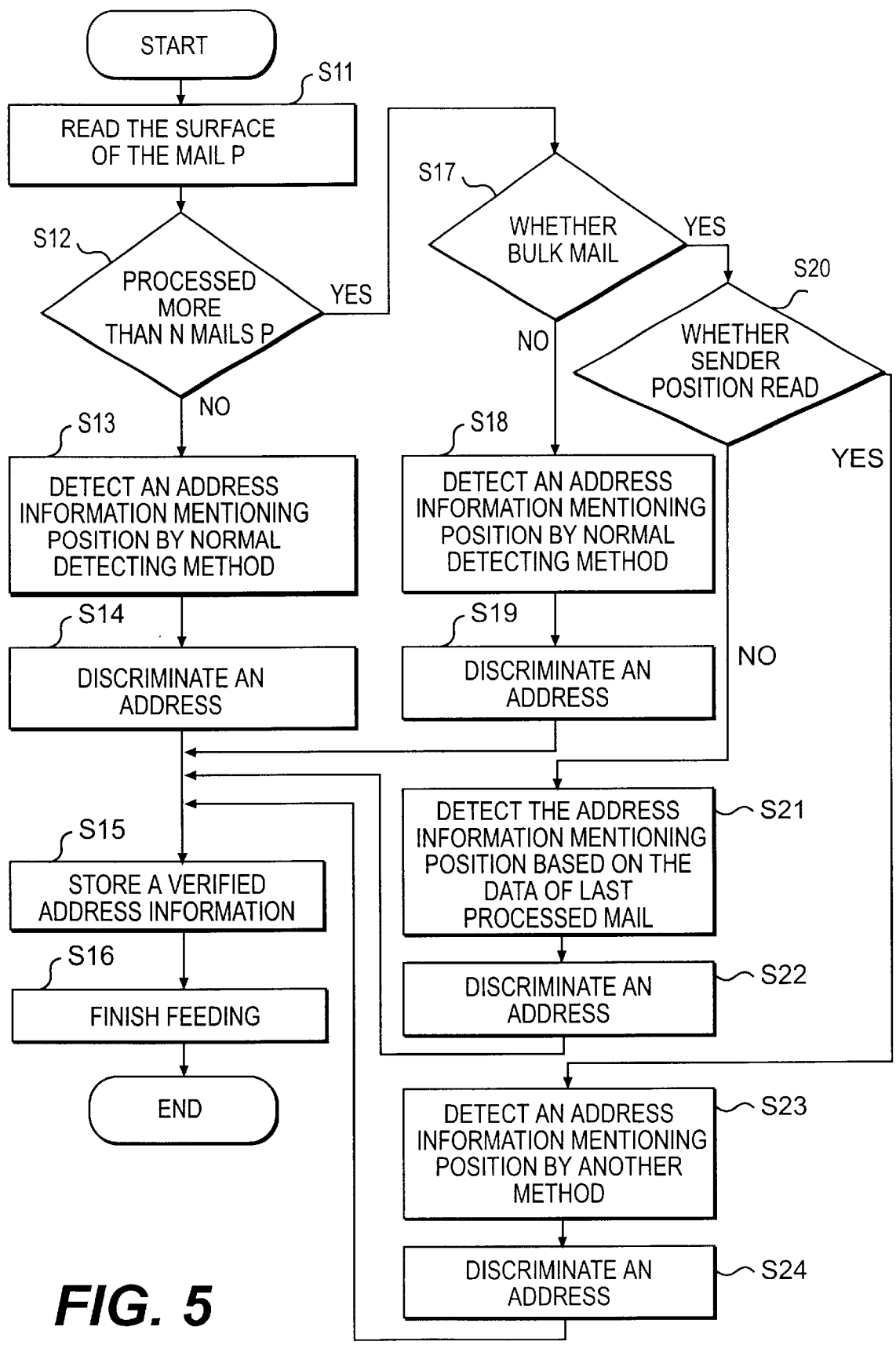
FIG. 5 is a flowchart of the operation of an apparatus detecting an address position in accordance with the second embodiment of the present invention.

In the following, the second method for detecting the address position at the address information mentioning position detecting unit 21 according to the second embodiment of the present invention is explained by referring to FIG. 1, FIG. 2, FIG. 5 and FIG. 6. FIG. 5 is a flowchart showing the operation of a mail processing apparatus detecting an address position according to the second embodiment of the present invention. FIG. 6 is a view of the mail processing apparatus according to the second embodiment of the present invention. In this method and apparatus according to the second embodiment of the present invention, the pattern registering database 16 is not used.

First, after the letters P are supplied to the mail supplier 2, the letters P are taken out one by one by the feeder 4 and transferred by the conveyer 3. The surface of the letter P is read by the scanner 5 and the image data of the letter P is captured by the photoelectric converter 6. (S11).

After S11, whether more than N letters P have been processed is judged (S12). When it is judged that more than N letters have not been processed at S12, a normal address information mentioning position is detected from the image data of the taken-in letter P (S13). On the basis of the address information mentioning position detected as in the above, first, the zip code number is discriminated and is decided by the line detecting and clipping unit 22, the digitizing unit 23, the character detecting and clipping unit 24, the zip code number detecting and clipping unit 29, and the zip code discriminating unit 30. Also the content of the dictionary of the street/firm names is limited on the basis of the zip code numbers. Successively, the discrimination of the street/firm name is performed at the street/firm name discriminating unit 26 by the line detecting and clipping unit 22, the digitizing unit 23, the character detecting and clipping unit 24 and the character discriminating unit 25. As described in the above, the processing is performed by utilizing the database 13, of which correlation scope is limited on the basis of the zip code numbers, and furthermore, the block number is discriminated by the block detecting and clipping unit 27 and the block number discriminating unit 28 (S14).

The discriminated result of the address information at S14 is inputted into the answer editorial unit 31 and verified as the address. The verified address information is stored in the data memory unit 32 (S15).

The data stored at S15 involves the image data of the present letter P, the size data of the present letter P corresponding to the image data, the coordinate data of the address information mentioning position of the present letter P corresponding to the image data, and the coordinate data of the address mentioning line of the present letter P corresponding to the image data. These data are stored for N up-to-date letters, while the old one is renewed. Also, when the data are stored in the data memory unit 32, the image data of the last letter P is compared with the image data, which are processed and stored just before, and it is judged, whether there is any change in the image. This judgement is performed, for example, by the value indicated by a correlation factor computed from the two image data. When the variation is little, both are judged as being the same letter format and stored as the variation data. When this variation data are accumulated for N−1 letters continuously during the processing many a letters, it is assumed that bulk mail is supplied and it is used for the judgement at S17.

The various data stored in the data memory unit 32 is used for the processing mentioned below.

The address verified at S15 is transferred to the controller 12 as the discriminated result.

The letter P is printed with the bar code of the address, which is coded by the bar code printer 9 according to the discriminated result obtained at this step, and the printed bar code is confirmed by the bar code reader 10. Furthermore, the letter P is passed through the step pass unit 11 and sorted by the sorter 8 and stacked.

When all the letters P, which are supplied by the mail supplier 2, are fed and processed completely (S16), the processing is finished.

When it is assumed that more than N letters have been processed by the judgment at S12, it is detected whether variation data are stored continuously accumulated for N−1 letters amount the various data stored in the data memory unit 32. When it is judged that the data of N−1 letters P are stored, the image data and the size data of the last letter P, which are stored just before, is read, among the image data stored for N letters. And then, the image data and the image data of the present letter P, which are read in by the photoelectric converter 6 are compared to each other, and it is judged whether there is variation between both images, whether bulk mail is process (S17). Before this judgement, the size data are compared first. If the sizes are found to be different by this comparison, it can be judged whether there is a variation, without performing complicated processing. When it is indicated that the letter size has not changed, e.g., the sizes are almost the same, both image data are compared to each other.

At S17, when it is judged that bulk mail is not processed, e.g., the variation between both types of mail is large, a normal detection of the address information mentioning position is performed the same as at S13 (S18), and successively a processing the same as at S14 is performed (S19). Then the processing is performed at S15 and S16. Thus, when the variation data is not stored continuously for N letters at S17, the processing is performed at S18 and S19.

When it is judged at S17 that bulk mail is processed, namely, there is little variation between both types of mail, it is judged, whether the position for the addresser is discriminated erroneously as the address information mentioning position, by checking the variation of the image data within the address information mentioning position, while reading out the image data and the coordinate data of the address information mentioning position of all the letter P for N letters stored in the data memory unit 32 (S20).

This judgement is explained by referring to FIG. 6. The data concerning N letters P consisting of Pa, Pb, Pc, . . . , Pe are stored in the data memory unit 32. It is assumed now that the letter Pf is processed. From the image data and the coordinates of corresponding address information mentioning position for N letters, the image data within address information mentioning position for N letters are extracted. Then, the extracted image data for N letters are compared each other and it is judged whether the variation is strong. This judgement is performed as S20.

In other words, if the addresser mentioning position is discriminated as the address information mentioning position, all the extracted image data shows the same addresser, mention the same address, that is to say, the variation is little. By checking the variation in such a way, it can be judged, whether the address information mentioning position is detected correctly.

When it is judged that the addresser mentioning position is not discriminated as the address information mentioning position, such as when it is judged that the extracted image data vary each other strongly, the address information mentioning position is right. Therefore, the address information mentioning position of the present letter Pf shown in FIG. 6 is detected by the coordinates of the address information mentioning position of the last letter PE (S21). Thereafter, processing is performed the same as at S14 (S22).

When it is judged that the addresser mentioning position is discriminated as the address information mentioning position, such as when it is judged that the extracted image data vary each other little, the detecting method for the address information mentioning position is changed, and a position different from the address information mentioning position, which is mentioned here, is detected (S23). Thereafter the processing is performed the same as at S14 (S24).

After the processing at S22 and S24, the processing at S15 and S16 is performed and the processing is finished.

The above-explained method is applied when the same kind of direct mail letters P are gathered together into a certain lot and supplied to the mail processing apparatus 1.

Successively, a method in which the address information mentioning position is detected efficiently, when the image of the letter P is not registered (for example, when the letter P is supplied to the mail processing apparatus little by little), is explained according to the third embodiment of the present invention.

Figure 7:
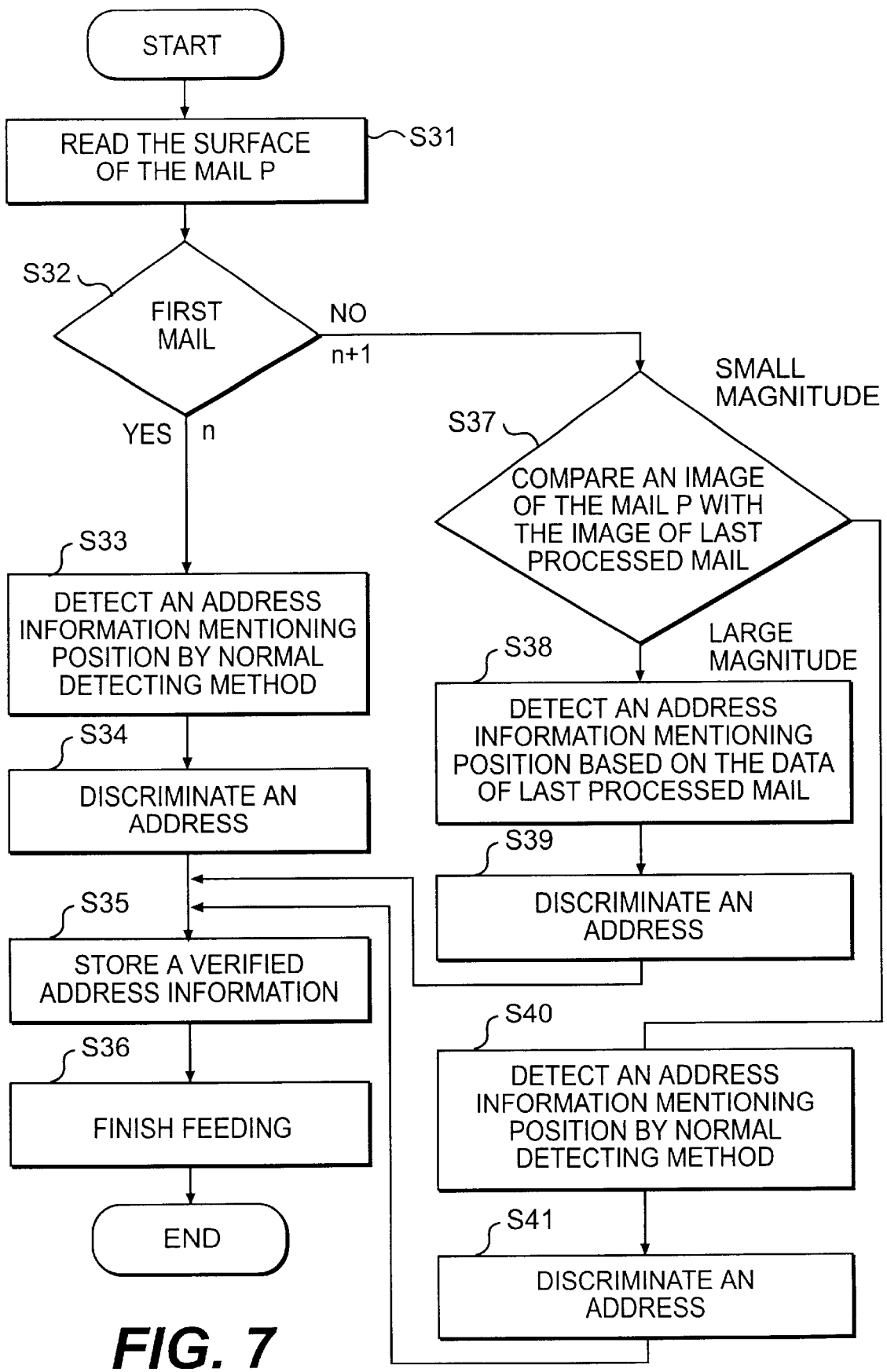
FIG. 7 is a flowchart showing an apparatus for detecting an address position in accordance with a third embodiment of the present invention.

The third embodiment of address position detecting method of the address information mentioning position detecting unit 21 is explained by referring to FIG. 1, FIG. 2, FIG. 7, FIG. 8 and FIG. 9. FIG. 7 is a flowchart of the address discriminating and mail processing apparatus according to the third embodiment of the present invention. FIG. 8 is a drawing showing an example of an image of the last letter and an image of the present letter, and FIG. 9 is a drawing showing a correlation detecting process according to the third embodiment of the present invention. In the third embodiment, a pattern registering database 16 is not used.

First, letters P are supplied by the mail supplier 2, and the letters P are taken up by the feeder 4 one by one and transferred by the conveyer 6. The surface of the letter P is read by the scanner 5 and the image data of the letter P is read by the photoelectric converter 6 (S31).

After S31, it is judged whether the letter P is the first one of a certain format (S32). If the letter is judged as the first one of the format by the judgement at S32, a normal address information mentioning position detection is performed from the image data of the letter P (S33). On the basis of the address information mentioning position detected by the way mentioned above, first, the zip code number is discriminated and decided by the line detecting and clipping unit 22 and the digitizing unit 23, character detecting and clipping unit 24, the zip code number detecting and clipping unit 29 and the zip code number discriminating unit 30. Also, the content of the dictionary of street/firm names in the database 13 can be limited on the basis of this zip code number. Successively, the street/firm name is discriminated at the street/firm name discriminating unit 26 through the line detecting and clipping unit 22, the digitizing unit 23, the character detecting and clipping unit 24 and the character discriminating unit 25 and the processing is performed using the database 13, which verification scope is limited on the basis of the zip code numbers as described above. Further, the block number is discriminated by the block number detecting and clipping unit 27 and the block number discriminating unit 28 (S34).

The discriminated result of the address information at S34 is inputted into the answer editorial unit 31, and verified as the address. The verified information of the address is stored in the data memory unit 32 (S35). The data to be stored here includes the image data of the present letter P, the size data of the present letter P corresponding to the image data, the coordinate data of the address information mentioning position of the present letter P corresponding to the image data, and the coordinate data of the address mentioning line corresponding to the image data, and only the data of the last one letter is stored while the data is renewed. These data are utilized at the later process.

The address verified at S35 is transferred to the controller 12 as the discriminated result. The letter P is printed with a bar code, in which the address is coded at the bar code printer 9 on the basis of the recognized result, and the printed bar code is verified by the bar code reader 10. Furthermore, the letter P is passed through the step pass unit 11 and distributed by the sorter 8 according to the address and stacked.

When all the letters supplied by the mail supplier 2 are supplied and processed completely (S36), the process is finished.

When the letter P is judged at S32 as not the first one (as the second or thereafter), the image data and the size data of the last letter P processed just before the present one, which are stored in the data memory unit 32 are called. First, the called size data and the size of the present letters P are compared; if it is judged as the result of the comparison that the sizes of both are almost the same, the image data of both types of mail are compared to judge the magnitude of the correlation degree (S37). As judgement, for example, if the image data of the preceded letter P shown in FIG. 8a is called from the data memory unit 32, and if the image data of the present letter P is as shown in FIG. 8b, it is judged that the correlation between them is large; and if the image data of the present letter is as shown in FIG. 8c, it is judged that the correlation is small.

The method of judging the magnitude of the correlation at S37 is explained. It is assumed that the specific value data of the image of FIG. 8a, for example, the projection data, is obtained as f(r) shown in FIG. 9a. Also, the specific value data of the image g(r) in FIG. 8b is obtained as shown in FIG. 9b and further, the specific value data of the image g'(r) in FIG. 8c is obtained as shown in FIG. 9c.

Though it can be judged whether two images are the same by observing the correlation of these specific value data, first, a dual correlation function of the specific values of both images is calculated, and this dual correlation function is compared with the threshold, which is obtained statistically, for judging the magnitude.

This calculation formula of the dual correlation function is obtained as shown below, when the equation of the specific value data of the letter P stored in the data memory unit 32 is expressed as f (x,y) and the equation of the specific value data of the present letter P is expressed as g (x,y).

$$R = \frac{\int\int f(x \cdot y) \cdot g(x \cdot y) dx \cdot dy}{\sqrt{\int\int f(x \cdot y)^2 dx \cdot dy + \int\int g(x \cdot y)^2 dx \cdot dy}}$$

According to the formula, it can be said that the larger R is, the larger is the magnitude of correlation between f (x,y) and g (x,y), and the greater the similarity.

FIG. 9d shows a diagram of correlation function R1, which is obtained by the above calculation formula from the specific value data f (r) of FIG. 9a and the specific value data g (r) of FIG. 9b, and FIG. 9e shows a diagram of correlation function R2, which is obtained by the above calculation formula from the specific value data f (r) of FIG. 9a and the specific value data g'(r) of FIG. 9c.

If the threshold is assumed as TH as shown in FIG. 9e and FIG. 9f, the correlation function R1 has a peak larger than threshold TH. This means that the image data of FIG. 8a and the image data of FIG. 8b have a large magnitude of correlation to each other, that is, these are mail of the same format.

On the other hand, if the correlation R2 has a peak smaller than threshold TH, the image data of FIG. 8a and the image data of FIG. 8c have a small magnitude of correlation to each other, and these are mail of different formats.

When the magnitude of correlation is judged as large at S37 as explained above, the coordinates of the address information mentioning position of the last letter P, which is stored in the data memory unit 32, is read, the image data corresponding to the position of the coordinates is detected as the address information mentioning position (S38). Thereafter, a processing the same as S34 is performed (S39).

When the magnitude of correlation is judged as small at S37, or when it is judged as different format by comparing the size data of the last letter with the size of the present letter P, a normal detection of the address information mentioning position the same as at S33 is performed (S40). Thereafter a processing the same as S39 is performed (S41).

After S39 and S41, the letter processed at S35 and S36 and the processing is finished.

The detecting method of the address information mentioning position as described in the above, is the method for detecting the address information mentioning position efficiently, when the image of the letter P is not registered and when, for example, the letter P such as direct mail of the same kind are supplied to the mail processing apparatus 1 little by little.

Next, in a fourth embodiment of the present invention, the method for detecting the address information mentioning position efficiently unifies the methods of the first, the second and the third embodiments of the present invention.

Figure 10:
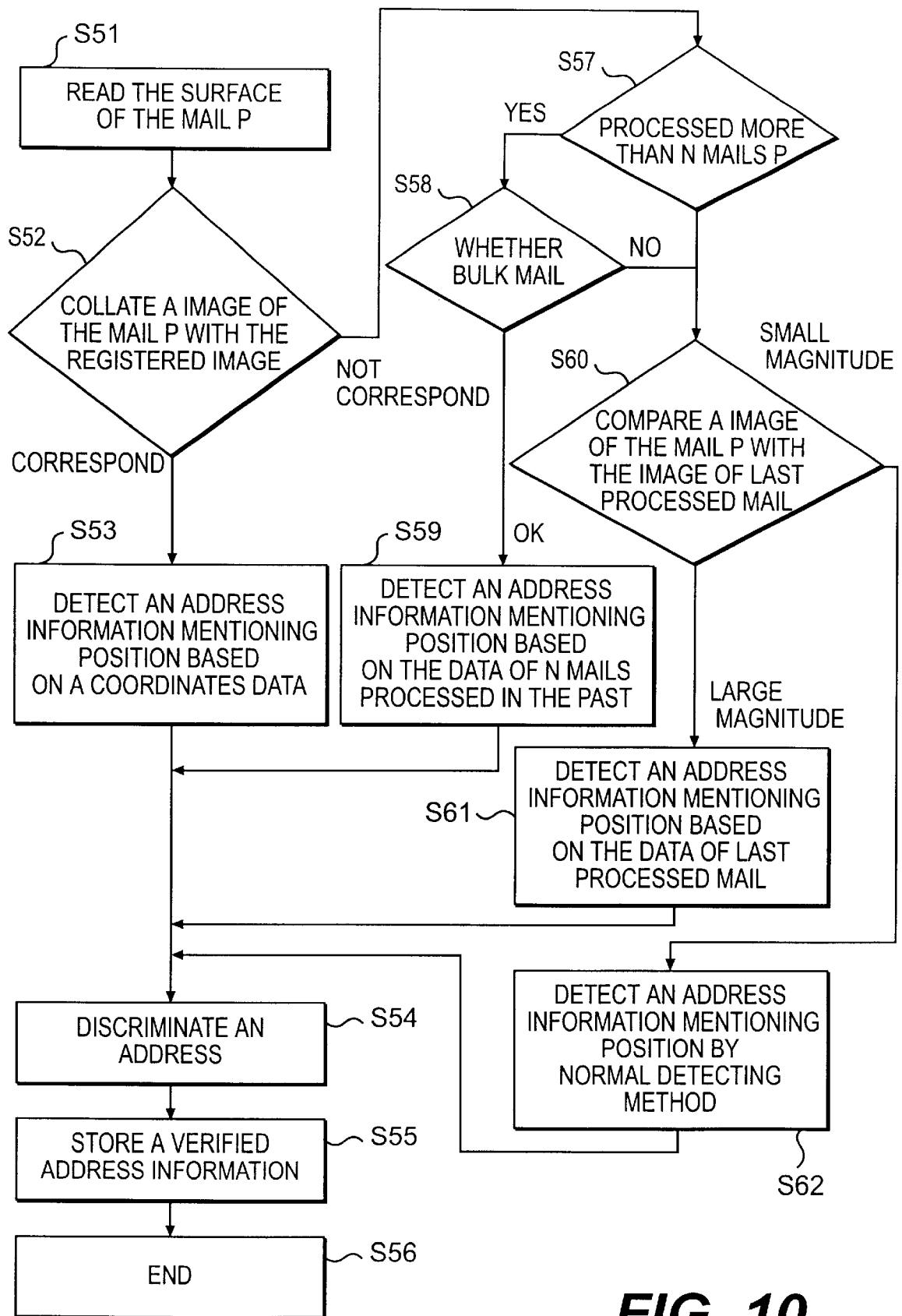
FIG. 10 is a flowchart of the operation of an apparatus detecting an address position according to a fourth embodiment of the present invention that integrates the three embodiments.

The fourth method for detecting the address information mentioning position at the address information mentioning position detecting unit 21 according to the fourth embodiment is explained by referring to FIG. 1, FIG. 2, FIG. 3, FIG. 5, FIG. 7 and FIG. 10. FIG. 10 is a flowchart showing an address information mentioning position detecting apparatus according to the fourth embodiment of the present invention, wherein the methods of the first, the second and the third embodiments of the invention are unified. Although the pattern registering data source 16 is not used in the cases of the second and the third embodiments, the same is used in this fourth embodiment of the present invention.

First, the letters P in a large quantity are set in the mail supplier 2 and the operation is started. The various data regarding the letter P, which are stored, are read by means of the control of the controller 12 from the pattern registering data source 16 as shown in FIG. 2 and are transferred to and stored in the memory (not shown) of the address information mentioning position detecting unit 21. In this connection, the content to be stored here is as explained at the first embodiment of the present invention.

Successively, when the letters P are supplied by the mail supplier 2, the letters P are taken out one by one by the feeder 4 and transferred by the conveyer 3. Then the surface of the letter P is read by the scanner 5 and the image data of the letter P is taken in by the photoelectric converter 6 (S51).

The image data which is taken in at S51 is transferred to the address information mentioning position 21 of the discriminating unit 7, and first the image data of the letter P is compared with the size data of the letter P, which is stored in the memory of the address information mentioning position 21 and registered data, which size is similar to the size of the letter P, are extracted. The extracted data of the registered data and the image data are correlated to each other (S52).

When it is judged that both images coincide as the result of the correlation at S52, the processing is performed on the basis of the coordinates of the address mentioning position the same as explained at S5 of FIG. 3 (S53). And further, the letter is processed the same as at S6 of FIG. 6 (S54).

The discriminated result of the address information at S54 is inputted into the answer editorial unit 31, and is verified as the address. The verified address information is stored in the data memory unit 32 (S55). The data, which are stored and processed here as explained by referring to S15 of FIG. 5, involve the image data of the present letter P, the size data of the present letter P corresponding to the image data, the coordinate data of the address information mentioning position of the present letter P corresponding to the image data, and the coordinate data of the address mentioning line of the present letter P corresponding to the image data. These are renewed and the data for N letters from the last one are stored. When these data are stored in the data memory unit 32, the image data of the present letter P is compared with the image data of the last letter P, which was processed and stored just before, and it is judged, whether there is nay variation. When the variation is little, the letter is judged as the letter of the same format and is stored in the memory as the variation data. And in the course of the processing of many letters P, when the variation data are successively for N−1 letters accumulated, it is judged that bulk mail is supplied, and the variation data are used for a judgement at S58, which is explained below. The various data, which are stored in the data memory unit 32, are utilized at the later processing.

The address verified at S55 is transferred to the controller 12 as the discriminated result. The letter P is printed with a bar code, in which the address is coded at the bar code printer 9 according to the discriminated result, which is obtained here. The printed bar code is confirmed at the bar code reader 10. Further the letter is passed through the step pass unit 11 and sorted at the sorter 8 according to the address and stacked.

When all the letters P supplied by the mail supplier 2 are supplied and processed completely (S56), the processing is finished.

According to the correlation at S52, when it is judged that the image data of the letter P, which is taken in from the photoelectric converter 6, does not coincide with the registered data, or when it is judged that the data size is different, it is judged whether more than N letters P are processed (S57). According to the judgement at S57, when it is judged that more than N have been processed, the processing as explained by referring to S17 and S20 of FIG. 5, are performed. In other words, it is detected, whether the variation data are stored successively for N−1 letters in the data memory unit 32 are accumulated, when it is judged that data for N−1 are accumulated, the image data and the size data of the last letter P, which has been stored just before, are read among the image data of the letters P for N letters. Then the image data and the image data of the present letter P, which has been taken in by the photoelectric converter 6 are compared each other and it is judged whether there is any variation between both image data, e.g. whether bulk mail is processed. Before this judgment, first, the size data are compared. Through this comparison, it can be judged whether there is variation, without performing a complicated processing, when the sizes are completely different. When it is indicated that there is no variation, e.g. the letters are the same size, both image data are compared to each other.

When it is judged through the comparison of both image data that bulk mail is processed, that is, that the variation is little, then the image data and the coordinate data of the address information mentioning position of all the N letters P stored in the data memory unit 32 are read and any variation of the image data within the address information mentioning position is investigated and it is judged whether any addresser in mentioning position is discriminated erroneously as the address information mentioning position (S58)

According to the judgement at S58, if it is judged that bulk mail is processed and that any addresser mentioning position is not discriminated erroneously as the address information mentioning position, the address information mentioning position of the present letter P is detected by the coordinate data of the address information mentioning position of the last letter, which has been stored just before, among the data for N letters, and which are stored in the data memory unit 21 as S21 of FIG. 5 (S59).

When variation data is not accumulated for N letters successively, the size data does not coincide, bulk mail is not processed , or the addresser in mentioning position is erroneously discriminated as the address information mentioning position, the same as at S37 of FIG. 7, it is judged whether the magnitude of correlation is large or small by comparing the image data of the present letter P with the image data of the last letter stored just before in the data memory unit 32 (S60). Also, when it is judged that the letter is not processed for more than N at S57, the processing advances to S60.

At S60, the size data and the image data of the last letter P, which is processed just before the present letter and which is stored in the data memory unit 32, is read. Then the size data, which is read, is compared with the size of the present letter P. When it is judged that both sizes are almost equal, the magnitude of the correlation is judged by comparing both image data to each other. The details are as per the explanation at S37. When it is judged that the magnitude of the correlation is large at S60, the coordinate data of the address information mentioning position of the last letter P must before the present letter, which is stored in the data memory unit 32 is read as explained at S38 of FIG. 7, and the address information mentioning position is detected by the coordinate data (S61).

When it is judged that the magnitude of the correlation is small or that the size data is different from the size of the present letter P, a normal address information mentioning position detection is performed (S62).

After the processing at S59, S61 and S62, the letters are processed at S54, S55 and S56 and the processing is finished.

As, described above, in the first embodiment of the present invention, the image of the letter, such as direct mail which is supplied in a large quantity, is registered beforehand as registered data; the registered data and the image data, which are read from the letter are compared each other, and thus the address information mentioning position is specified. For this reason, in respect to direct mail, an efficient discrimination processing of the address information can be performed and the load of the operator can be reduced, as it is not necessary for the operator to specify the position of the address information by a cursor mode.

Also in the second embodiment of the present invention, the image data of the letters are stored for the specified number of the letters transferred in order, and it is judged, whether these are of the same format. If it is judged that they are of the same format by this judgement, the address information mentioning position is specified just by comparing the image data of the successively transferred letters with the image data stored. For this reason, in respect to direct mail, an efficient discrimination processing of the address information can be performed and the load of the operator can be reduced, an the operating costs can be effectively reduced, as it is not necessary for the operator to specify the position of the address information by a cursor mode and as the image data of direct mail is not necessary to be registered beforehand.

Also, in the third embodiment of the present invention, the address information mentioning position can be specified by storing only the image data of the last letter just before the present one, and by judging the magnitude of correlation between the image data and image data of the present supplied letter, the address information mentioning position is specified. For this reason, in respect to direct mail, an efficient discrimination processing of the address information can be performed for each letter and the load of the operator can be reduced, and the operating costs can be effectively reduced, as it is not necessary for the operator to specify the position of the address information by a cursor mode and as the image data of direct mail is not necessary to be registered beforehand.

Also, in the fourth embodiment, by means of the algorithm combining the first, the second and the third embodiments of the present invention, the address information mentioning position is specified and in case that the address information mentioning position cannot be easily specified from the letter such as direct mail by the processing explained at the first embodiment, the letters are processed by the method explained in the second embodiment and further processed by the method explained in the third embodiment to specify the address information mentioning position. For this reason, in respect to direct mail, an efficient discrimination processing of the address information can be performed in every case and the load of the operator can be reduced, and it is useful for reducing the operating costs and the rate of misreading can be reduced, as it is not necessary for the operator to specify the position of the address information by a cursor mode and as the image data of direct mail is not necessary to be registered beforehand.

Other embodiments of the invention will be apparent to those skilled in the art from consideration of the specification and practice of the invention considered as exemplary only, with a true scope and spirit of the invention being indicated by the following claims.

What is claimed is:

1. A method for recognizing an address of a letter, the method comprising:
   storing whole images and coordinated data of an address information mentioning position corresponding to the whole image of processed letters;
   comparing a last stored whole image with an immediate previous stored whole image to judge whether conformable;
   assuming processed mail is bulk mail when an accumulated conformity is greater than a number by comparing result;
   obtaining a whole image of a letter;
   correlating the whole image with the last stored whole image; and
   detecting an address information mentioning position from the obtained whole image based on the coordinate data when the assuming result indicates bulk mail and the correlating result indicates conformity.

2. A method as in claim 1, further comprising:
   storing size data corresponding to the stored whole image;
   correlating a size of the obtained whole image with the stored size data before correlating the obtained whole image with the stored whole image; and
   stopping the correlating of the obtained whole image with the stored whole image when the size does not conform.

3. A method as in claim 2, further comprising:
   correlating the obtained image in the address information mentioning position with the stored image in the address information mentioning position based on the coordinate data, after correlating the obtained whole image with the stored whole image; and
   stopping the recognition of the address based on the coordinate data when the address information mentioning position correlating result indicates nonconformity.

4. A method as in claim 3, further comprising:
   renewing the stored whole image and coordinate data of an address information mentioning position corresponding to the whole image of processed letters when a letter is processed.

5. A method as in claim 2, further comprising:
   renewing the stored whole image and coordinate data of an address information mentioning position corresponding to the whole image of processed letters when a letter is processed.

6. A method as in claim 1, further comprising correlating the obtained image in the address information mentioning position with the stored image in the address information mentioning position based on the coordinate data, after correlating the obtained whole image with the stored whole image; and
   stopping the recognition of the address based on the coordinate data when the address information mentioning position correlating result indicates nonconformity.

7. A method as in claim 6, further comprising:
   renewing the stored whole image and coordinated data of an address information mentioning position corresponding to the whole image of processed letters when a letter is processed.

8. A method as in claim 1, further comprising:
   renewing the stored whole image and coordinate data of an address information mentioning position corresponding to the whole image of processed letters when a letter is processed.

9. A method for recognizing an address of a letter, the method comprising:
   registering data including a whole image and coordinate data of an address information mentioning position corresponding to the whole image of a reference letter;
   storing whole image and coordinate data of an address information mentioning position corresponding to the whole image of processed letters;
   comparing the last stored whole image with the stored whole image before the last stored whole image and judging whether the images have conformity;
   assuming processed mail is bulk mail when the conformity accumulates to a prespecified number according to the comparing result; obtaining a whole image of a letter;
   correlating the whole image with the registered whole image or the last stored whole image; and
   detecting an address information mentioning position from the obtained whole image based on the coordinate data when the correlating result indicates conformity with the registered whole image or the correlating result indicates conformity with the last stored whole image and the assuming result indicates bulk mail.

10. A method as in claim 9, further comprising storing size data corresponding to the stored whole image;

correlating a size of the obtained whole image with the stored size data before correlating the obtained whole image with the stored whole image; and stopping the correlating of the obtained whole image with the stored whole image when the size does not conform.

11. A method as in claim 10, further comprising renewing the stored whole image and coordinate data of an address information mentioning position corresponding to the whole image of processed letters when a letter is processed.

12. A method as in claim 9, further comprising correlating the obtained image in the address information mentioning position with the stored image in the address information mentioning position based on the coordinate data, after correlating the obtained whole image with the stored whole image; and stopping the recognition of the address based on the coordinate data when the address information mentioning position correlating result indicates nonconformity.

13. A method as in claim 17, further comprising:

renewing the stored whole image and coordinate data of an address information mentioning position corresponding to the whole image of processed letters when a letter is processed.

14. A method as in claim 9, further comprising:

renewing the stored whole image and coordinate data of an address information mentioning position corresponding to the whole image of processed letters when a letter is processed.

15. A mail processing apparatus for processing a letter on which an address is written, comprising:

means for storing whole image and coordinate data of an address information mentioning position corresponding to the whole image of processed letters;

means for comparing the last whole image stored by the storing means with the whole image stored by the storing means just before;

means for judging conformity of images based on the comparison result by the comparing means;

means for assuming, processed mail is bulk mail when the conformity accumulates to a number by the judging means;

means for obtaining a whole image of a letter;

means for correlating the whole image obtained by the obtaining means with the last stored whole image stored by the storing means; and means for detecting an address information mentioning position from the obtained whole image based on the coordinate data stored in the storing means when the assuming result indicates bulk mail by assuming means and the correlating result indicates conformity by correlating means.

16. A mail processing apparatus as in claim 15, further comprising:

the storing means storing size data corresponding to the stored whole image;

the correlating means correlating a size of the whole image obtained by the obtaining means with the size data stored by the storing means before correlating the obtained whole image with the stored whole image; and means for stopping the correlating of the obtained whole image with the stored whole image by the correlating means when the size does not conform.

17. A mail processing apparatus as in claim 16, further comprising:

the correlating means correlating the image, obtained by the obtaining means, in the address information mentioning position based on the coordinate data stored by the storing means, after correlating the obtained whole image with the stored whole image; and means for stopping a recognition of the address based on the coordinate data when the address information mentioning position correlating result indicates nonconformity by the correlating means.

18. A mail processing apparatus as in claim 17, further comprising:

means for renewing the stored whole image and coordinate data of an address information mentioning position corresponding to the whole image of processed letters when a letter is processed.

19. A mail processing apparatus as in claim 16, further comprising:

means for renewing the whole image and coordinate data of an address information mentioning position stored by the storing means corresponding to the whole image of processed letters when a letter is processed.

20. A mail processing apparatus as in claim 15, further comprising:

the correlating means correlating the image, obtained by the obtaining means, in the address information mentioning position based on the coordinate data stored by the storing means, after correlating the obtained whole image with the stored whole image; and means for stopping a recognition of the address based on the coordinate data when the address information mentioning position correlating result indicates nonconformity by the correlating means.

21. A mail processing apparatus as in claim 20, further comprising:

means for renewing the stored whole image and coordinate data of an address information mentioning position corresponding to the whole image of processed letters when a letter is processed.

22. A mail processing apparatus as in claim 15, further comprising:

means for renewing the whole image and coordinate data of an address information mentioning position stored by the storing means corresponding to the whole image of processed letters when a letter is processed.

23. A mail processing apparatus for processing a letter on which an address is written, comprising:

means for registering data including a whole image and coordinate data of an address information mentioning position corresponding to the whole image of a reference letter;

means for storing whole image and coordinate data of address information mentioning position corresponding to the whole image of a reference letter; means for comparing the last stored whole image with the stored whole image before the last stored whole image means for judging whether the images have conformity; means for assuming processed mail is bulk mail when the conformity accumulates to a prespecified number according to the comparing result;

means for obtaining a whole image of a letter;

means for correlating the whole image with the registered image or the last stored whole image; and means for detecting an address information mentioning position from the obtained whole image based on the coordinate data when the correlating result indicates conformity with the registered whole image or the correlating result indicates conformity with the last stored whole image and the assuming result indicates bulk mail.

24. A mail processing apparatus as in claim 23, wherein:

the storing means stores size data corresponding to the stored whole image;

the correlating means correlates a size of the obtained whole image with the stored size data before correlating the obtained whole image with the stored whole image; and wherein the mail processing apparatus further comprises means for stopping the correlating of the obtained whole image with the stored whole image by the correlating means when the size does not conform.

25. A mail processing apparatus as in claim 24, further comprising:

means for renewing the stored whole image and coordinate data of an address information mentioning position corresponding to the whole image of processed letters when a letter is processed.

26. A mail processing apparatus as in claim 23, wherein:

the storing means stores size data corresponding to the stored whole image;

the correlating means correlates a size of the obtained whole image with the stored size data before correlating the obtained whole image with the stored whole image; and wherein the mail processing apparatus further comprises means for stopping the correlating of the obtained whole image with the stored whole image by the correlating means when the size does not conform.

27. A mail processing apparatus as in claim 26, further comprising:

means for renewing the stored whole image and coordinate data of an address information mentioning position corresponding to the whole image of processed letters when a letter is processed.

28. A mail processing apparatus as in claim 23, further comprising:

means for renewing the stored whole image and coordinate data of an address information mentioning position corresponding to the whole image of processed letters when a letter is processed.

* * * * *